Aug. 30, 1966  S. C. JORDAN  3,270,183
CIRCUITRY FOR ELECTRIC OVEN
Filed Nov. 14, 1963  3 Sheets-Sheet 1

INVENTOR.
SAMUEL C. JORDAN
BY Richard L. Caslin
HIS ATTORNEY

Aug. 30, 1966     S. C. JORDAN     3,270,183
CIRCUITRY FOR ELECTRIC OVEN
Filed Nov. 14, 1963     3 Sheets-Sheet 3
FIG.4
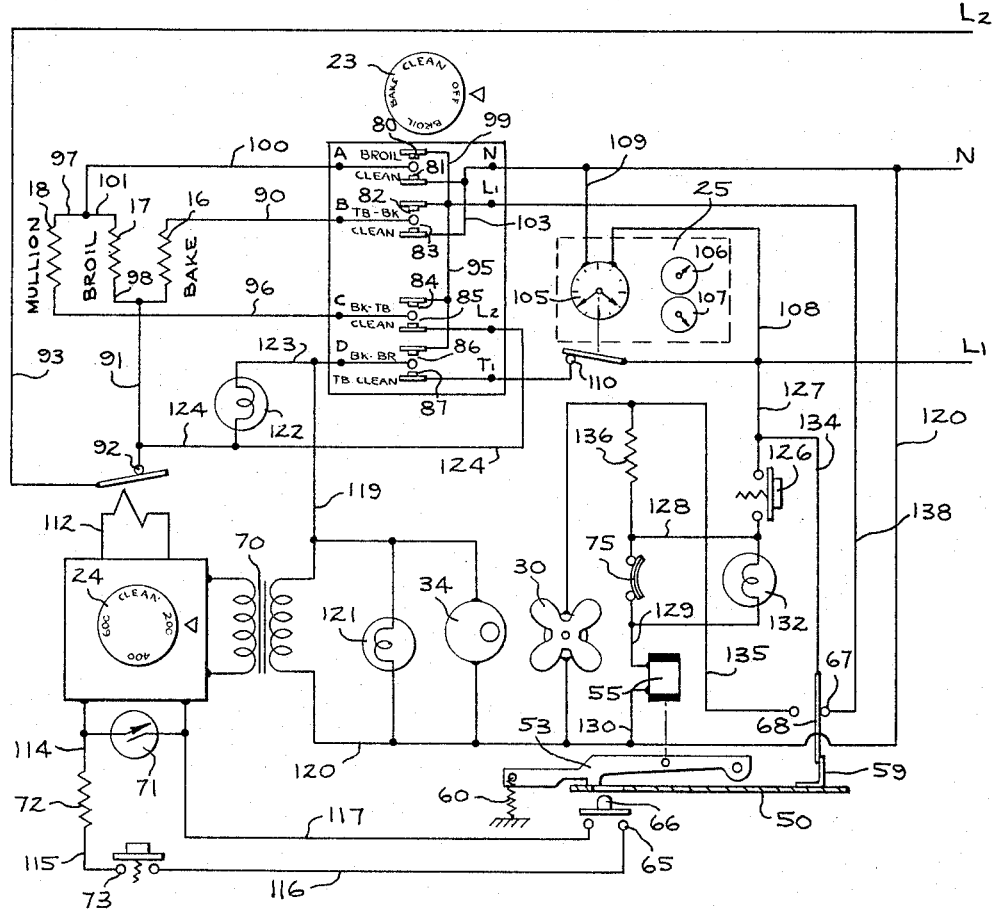
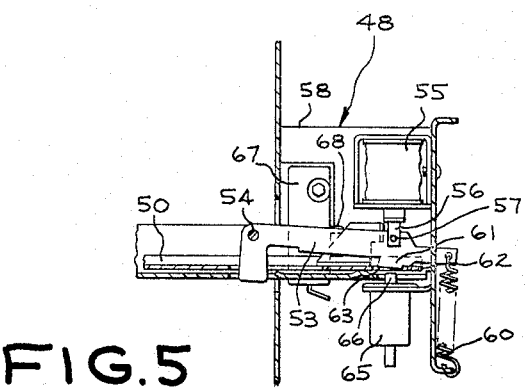
FIG.5
INVENTOR.
SAMUEL C. JORDAN
BY *Richard L. Caslin*
HIS ATTORNEY United States Patent Office 3,270,183
Patented August 30, 1966

3,270,183
CIRCUITRY FOR ELECTRIC OVEN
Samuel C. Jordan, Lyndon, Ky., assignor to General Electric Company, a corporation of New York
Filed Nov. 14, 1963, Ser. No. 323,810
10 Claims. (Cl. 219—398)

The present invention relates to an electric range having in addition to the normal cooking functions, a high temperature heat cleaning operation where the temperature is raised to a maximum that may fall anywhere in a range between about 750° F. and 950° F. for effecting the removal of the food soil and grease spatter that accumulates on the walls of the oven liner during normal cooking. Such operation may be characterized as pyrolysis or thermal decomposition, often in the absence of air.

A successful high temperature heat cleaning oven is described and claimed in the patent of Bohdan Hurko, No. 3,121,158, which was filed on December 13, 1962, as a continuation-in-part of an earlier application Serial No. 27,926 that was filed on May 9, 1960, and is now abandoned. This patent is assigned to the General Electric Company, the assignee of the present invention.

Probably the major annoyance in using an oven is the difficulty encountered in keeping the walls of the oven liner clean. There is a tendency for food particles and grease spatterings to accumulate on the hot oven surfaces during normal cooking operations. Strong cleaning agents have been devised and are commercially available for the express purpose of removing food soil of this type under these circumstances. However, even the best of these cleaning agents require a strong rubbing action and a great deal of time and effort is needed to complete the task satisfactorily.

Once the principle of automatic heat cleaning by the method of pyrolysis was proved to be both feasible and practical different systems of heating and control arrangements were devised to obtain the desired results. Components were assembled in a manner to be fail-safe so that after years of trouble-free usage of the oven if a component were to fail the failure would not constitute a safety hazard, but, instead, would merely render inoperative the circuit or function in which the component operates.

The present invention is concerned with several basic concepts such as the power circuit arrangement for the baking operation so as to obtain, at the least cost and with maximum reliability, the operation of the baking element at full wattage, while a broiling element for the oven is operated at approximately one-quarter of its rated wattage.

Preferably also, a mullion heater element adjacent the door will be provided which will be used both in the baking and heat cleaning operations.

Moreover, the circuit arrangement is such that a simple, single pole thermostat to control the desired temperatures for all of the various heating cycles may be used.

Also, protective means have been devised to insure that the oven controls cannot be set to the heat cleaning temperature while the oven selector switch is positioned at either the baking or the broiling positions whenever the full voltage of the power supply is used. As will be explained hereinafter, the porcelain enamel on the oven liner might be damaged if the heating elements were operated at full voltage during a heat cleaning cycle. Also, door latch means have been provided for the oven door to lock it closed during the heat cleaning operation, and indicator means have been devised in cooperation with the door latch means to indicate to the housewife the condition of the latch means.

The principal object of the present invention, therefore, is to provide an electric oven with a novel heating or power circuit during the baking operation by using a combination of three heating elements such as a baking element, a broiling element, and a mullion heater in the vicinity of the oven door.

A further object of the present invention is to provide an electric oven of the class described with a high temperature heat cleaning cycle that operates at a slow rate of energy utilization so as to obtain a gradual build up of temperature within the oven.

A further object of the present invention is to provide an electric oven with a high temperature heat cleaning operation, and protective means to insure that the heat cleaning cycle cannot be initiated when the heating circuit is improperly arranged at either a baking or a broiling condition.

A still further object of the present invention is to provide an electric oven with a high temperature heat cleaning operation and visual indicating means to signal the condition of the door latch during the high temperature operation of the oven.

The present invention, in accordance with one form thereof, is embodied in an electric oven that has at least three heating elements provided for the oven compartment such as the lower baking element, an upper broiling element and a mullion heater arranged adjacent the door. An oven selector switch means is provided for connecting the heating elements in various circuit arrangements such as for a baking operation where the baking element is energized at full line voltage while the mullion heater and the broiling element are connected in series in a parallel circuit with the baking element. For a broiling operation, the broiling element is energized at full line voltage. The heat cleaning circuit has all three heating elements, the baking element, the broiling element and the mullion heater energized so as to restrict the rate of temperature rise during the heat cleaning operation. An example of an acceptable circuit would be to have all three heating elements connected in parallel across one-half line voltage.

A temperature control means is provided for governing the energization of the heating elements according to the temperature levels desired. Another feature of this invention is to incorporate a single sequence timer in the power circuit of the heating system so as to provide both a timed baking operation as well as a timed heat cleaning operation. It is well to prevent the possibility of the initiation of the heat cleaning cycle in the event the selector switch is set to either the baking or the broiling position, for if this could occur the rate of temperature rise would be excessive and damage might occur to the porcelain enamel of the oven liner. A protective means in the form of a door latch operated switch means controls one of two possible circuits, where a first circuit is closed to the power supply for the baking and broiling circuits when the door latch means is open, while a second circuit is closed when the door latch is closed in its door locking position to energize an indicator light means and inform the user of the condition of the door latch.

My invention will be better understood from the following description taken in conjunction with the accompanying drawings and its scope will be pointed out in the appended claims.

FIGURE 4 is both a power and a control circuit diagram for the heating system of the oven of the present invention.

FIGURE 5 is a fragmentary right side cross-sectional elevational view of the back portion of the door latching means taken on the lines 5—5 of FIGURE 3.

Figure 1:
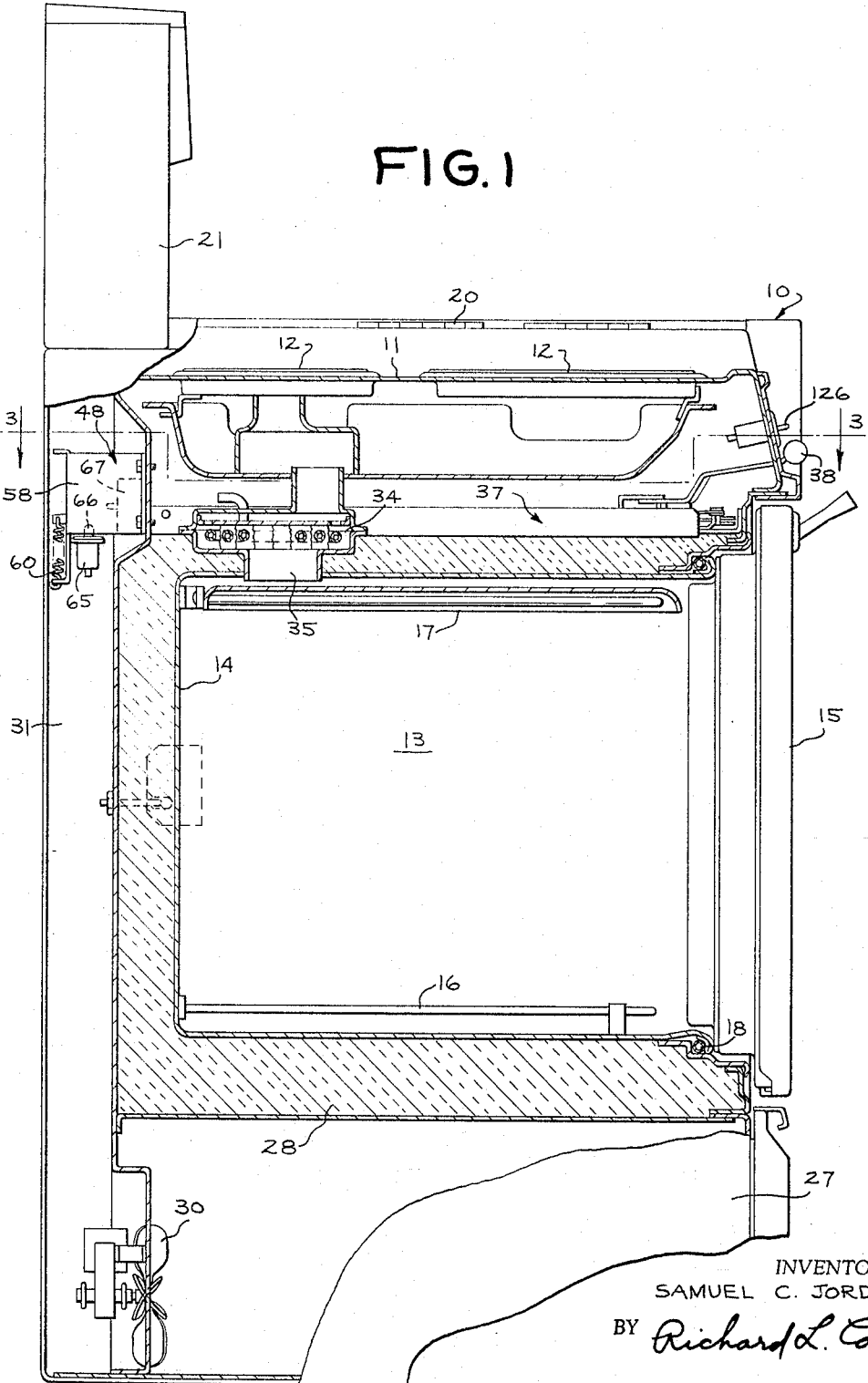
FIGURE 1 is a left side elevational view of a free-standing electric range with parts broken away and some in cross-section to show the main elements of the oven which has the automatic heat cleaning feature embodying the present invention.
Figure 2:
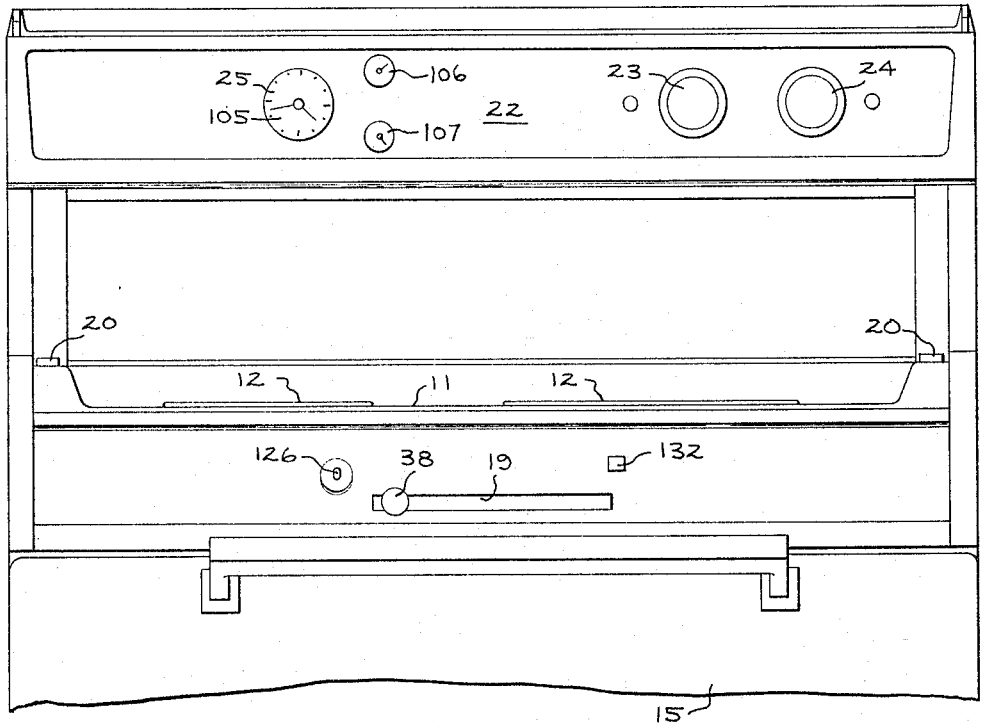
FIGURE 2 is a fragmentary front elevational view of the range showing the upper portion thereof and mainly the relationship between the oven door, the door latch means, the cooktop and the control panel of the range.

Turning now to a consideration of the drawings and in particular to FIGURE 1 there is shown for illustrative purposes a free-standing electric range 10 having a top cooking surface or cooktop 11 with a plurality of surface heating elements 12, an oven cavity 13 formed by a box-like oven liner 14 and a front-opening drop door 15. The oven cavity 13 is supplied with the two electric resistance heating elements; namely, a lower baking element 16 and an upper broiling element 17. A third heating element has been added adjacent the oven door 15, and it is a mullion heater 18 that is wrapped around the oven liner in a manner that is taught by the Newell Patent 3,017,488, which is assigned to the General Electric Company, the assignee of the present invention. The control of the surface heating elements 12 is obtained by selector switches 20 which are illustrated as pushbutton switches arranged in pairs along the opposite side arms of the cooktop 11 to be oriented with the particular heating element that is being controlled thereby. In addition, the range is provided with a backsplash 21 that is arranged along the back edge of the cooktop and is vertically disposed as shown and provided with a control panel 22 as is best seen in FIGURE 2 which contains most of the remaining controls for the surface heating elements 12 as well as for the oven compartment. Such a control panel would ordinarily include an oven selector switch 23, an oven thermostat 24, an automatic surface unit control, a sequence timer 25 and suitable indicator lights to show when one or more of the heating elements is energized.

Other structural features that might be mentioned by name would be the outer range body or cabinet 27 which has an appearance finish on the outer surface and which supports and encloses the various components of the range. Sandwiched between the oven liner 14 and the range body or cabinet 27 is a thick blanket of thermal insulating material such as fiberglass or the like. The amount of insulation being used has been increased over the amount of insulation for standard ovens because of the high operating temperatures encountered during the heat cleaning operation which will reach a maximum oven air temperature somewhere between about 750°F and about 950°F. Another component shown is an air circulating fan 30 located in the bottom portion of the range adjacent the back wall thereof. This fan serves to draw relatively cool room air into the range body 27 through the back of the backsplasher 21 and down a vertical duct or wiring channel 31 at the back of the range and into the bottom portion of the range where it rises up suitable ducts (not shown) built into the opposite side walls of the oven where the air is discharged under the cooktop 11 and is exhausted through openings in and around the surface heating elements 12.

During the heat cleaning operation water vapor, free carbon, soot and carbon monoxide gases are formed and these are treated before returning them to the kitchen atmosphere. A catalytic smoke eliminator 34 is positioned in an oven vent opening 35 to serve as an exhaust means for the oven. This catalytic smoke eliminator is of the type that is taught in the Welch Patent 2,900,483, which is assigned to the General Electric Company, the assignee of the present invention. Such a smoke eliminating device includes a heating means in cooperation with a catalytic platinum surface such as a wire screen that is heated to a temperature of about 1300°F. and tends to consume the smoke, odors and vapors emanating from the oven cavity so that the oven exhaust is treated in the manner that is best described in the before mentioned Hurko Patent No. 3,121,158.

Figure 3:
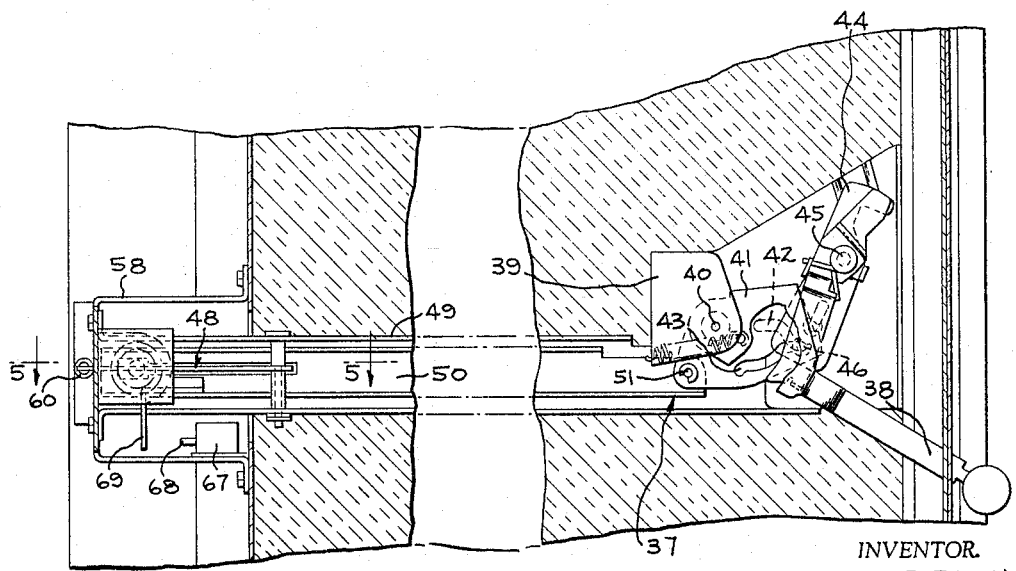
FIGURE 3 is a fragmentary plan view taken on the line 3—3 of FIGURE 1 to show the nature of the door latch means and the means for locking the door latch means during the high temperature heat cleaning operation.

It has been found desirable to provide a latch means for the oven door 15 to insure that the oven door is closed and cannot be opened while the oven is being operated on a heat cleaning cycle. The particular door latch mechanism is identified as 37 in FIGURES 1 and 3, and is disclosed in the patent of Clarence Getman, No. 3,189,375, which was filed on May 1, 1963, and is also assigned to the General Electric Company, the assignee of the present invention, to which reference is made for a detailed description of the latch mechanism. The latch mechanism includes a manually operable handle lever 38 which extends through an elongated slot 19 in the front edge of the cooktop 11 of the range in a position just above and parallel to the top edge of the oven door 15 as is best seen in FIGURES 1 and 2. Referring to FIGURE 3, the handle lever 38 is pivotally supported within a channel-shaped bracket 39 at the pivotal axis 40. The pivoted end of the handle lever 38 has a channel formation 41 which fits snugly into the channel bracket 39 to provide a pair of double pivot means or trunnions so as to gain stability as the handle lever is moved within a horizontal plane through an angle of about 60° starting from the open position of FIGURE 3 to a closed position. The channel bracket 39 includes a cam-shaped slot 42 in its lower flange cooperating with a cam-shaped slot 43 in the pivoted channel end 41 of the handle lever. Next, there is a pivoted latching bolt 44 which is pivoted about a generally central axis 45 between a recessed or hidden position shown in FIGURE 3 to a latching position that is generally perpendicular with the front wall of the oven and in mating engagement with a keeper (not shown) within the oven door 15. The innermost end of the latching bolt 44 is provided with a follower pin 46 which operates within both cam slots 42 and 43 to obtain the proper action. It should suffice to summarize that the door latch mechanism includes a pivoted handle lever 38, a fixed mounting bracket 39 and a pivoted latching bolt 44 for making engagement with the oven door 15. The particular details of the mechanism can be obtained from the previously-mentioned Getman application which is copending herewith.

Associated with the door latch means 37 is a solenoid-operated locking means 48 for locking the door latch mechanism 37 in both the open and the closed positions. This feature is being described and claimed in a copending application of Clarence Getman Serial No. 323,809, which was filed concurrently herewith, and is also assigned to the General Electric Company, the assignee of the present invention. The door latch mechanism is locked in the open position to insure that it cannot be thrown to the closed position inadvertently, and it is locked in the closed position to insure that the door cannot be unlocked and opened during a high temperature heat cleaning operation. The locking mechanism 48 is represented by an elongated channel-shaped support bracket 49 that extends from the front to the back of the range and is made integral with the mounting bracket 39 of the door latch mechanism 37. The other end of the support bracket 49 terminates within the cooling duct or wiring channel 31 and the back of the oven. The main purpose for locating the locking mechanism 48 at a distance remote from the door latch mechanism 37 is to remove the locking mechanism 48 from the high temperature areas of the range and to place the locking mechanism within the stream of relatively cool room air that is drawn into the range by the fan 30 as mentioned previously. Movably mounted within the support bracket 49 is a connecting rod 50 which is joined at its front end to the handle lever 38 of the door latch mechanism as at pivot point 51. Accordingly, as the handle lever 38 is shifted from its open to its closed position the connecting rod 50 will reciprocate within the support bracket 49 through a distance of about one inch.

At the back end of the locking mechanism 48 is a solenoid-operated pivoted bolt 53 for making engagement with the connecting rod 50 in both of its extreme positions, thereby requiring the movement of the pivoted bolt before the connecting rod can be moved. The bolt 53 is pivoted about the horizontal axis 54 and it is motivated by the solenoid 55 that has a vertically acting armature 56 pivotally connected to the bolt as at 57. The solenoid 55 is fastened to a hat-shaped channel member or bracket 58, said bracket being utilized to mount the combined door latch mechanism 37 and locking mechanism 48 to the range body. The pivoted bolt 53 is normally biased in a downward direction by a tension spring 60. The other end of the bolt has a downturned finger portion 61 that cooperates with both the back edge 62 of the connecting rod and a slot 63 that is spaced a slight amount from the back edge. Looking at FIGURE 5 of the drawing, the connecting rod 50 is shown in its position when the handle lever 38 is in its open position of FIGURE 3. The finger 61 of the pivoted bolt 53 is lodged in the slot 63 of the connecting rod so that the rod cannot be moved until the solenoid 55 is energized to lift the bolt out of the slot against the downward force exerted by the tension spring 60. When the handle lever 38 is in its closed position, the finger 61 of the bolt 53 is engaged behind the innermost end 62 of the connecting rod so that the door latch mechanism cannot be opened until the solenoid 55 is operated to lift the bolt as before.

A temperature senser switch controller 65 is positioned below the finger 61 of the pivoted bolt 53, and this switch has a button 66 that is contacted by the finger 61 when the door latch mechanism is closed and the solenoid 55 is deenergized for reasons which will be better understood hereinafter. A second switch member 67 is mounted to the bracket 58, and it has a switch button 68 that is adapted to be engaged by a tab 69 that is integral with the connecting rod 50 as is best seen in FIGURE 3. This latch switch 67 is a single pole double throw switch serving as part of a protective means for the oven as will be fully explained hereinafter.

Turning now to a consideration of the circuit diagram of FIGURE 4, the electric range of the present invention is provided with an electrical service of 3-wire Edison source of power nominally of 240 volts, single phase, 60 cycle A.C. which is usually available in the average residence having adequate wiring. This voltage source has a pair of line wires L1 and L2 and a grounded neutral conductor N for supplying the sequence timer 25, the oven selector switch 23, and the load characterized by the three heating elements, the baking element 16, the broiling element 17 and the mullion heater 18; as is well understood the voltage across lines L1 and L2 is 240, whereas that between L1 or L2 and the wire N is one-half that. There is also a low voltage temperature control circuit for the oven thermostat 24 which is derived by use of a stepdown transformer 70 for providing about 12 volts in a circuit that includes the thermostat 24, a temperature senser 71, a biasing resistor 72 which will be explained hereinafter, the senser switch controller 65 and a door-operated switch 73 which will be explained hereinafter.

In addition to the power circuit and the low voltage temperature control circuit there is a door latch control circuit that includes the following elements such as the connecting rod 50 of the door latch mechanism, the pivoted bolt 53 that is operated by the solenoid 55, the single pole, double throw latch switch 67 that is operated by the movement of the door latch mechanism, and the fan motor 30 for circulating room air between the range body and the insulated oven structure. Means are also provided to prevent the operation of the door latch once the temperature within the oven cavity rises above the normal cooking temperatures of about 550° F. up to a maximum of about 950° F. For this purpose a thermostatic switch 75 is arranged in series with the solenoid 55 so that as soon as the oven temperature rises above the normal cooking temperatures, the thermostatic switch 75 will open and the solenoid is thereby de-energized so that the door latch mechanism cannot be moved until the oven temperature returns to the normal cooking temperature range. More details of this door latching system will be given after detailed descriptions of the power circuit, and the temperature control circuit.

The oven selector switch 23 is provided with line terminals N, L1, L2 and T1 for connection with the leads to the power supply. Terminal T1 is for use by the sequence time 25 as will be explained later. The selector switch 23 also has a plurality of load terminals identified as A, B, C, and D, as well as eight sets of switch contacts 80–87 inclusive. These switch contacts are each labeled with the operation that takes place when the contacts are closed. For example, during a baking operation, contacts 82, 84 and 86 are closed. During a broiling operation contacts 80 and 86 are closed. During a time baking operation contacts 82, 84 and 87 are closed. Finally, during a heat cleaning operation contacts 81, 83, 85 and 87 are closed.

The baking circuit has the baking element 16 connected directly across 240 volts from L1 to L2, while at the same time the broiling element 17 is in series with the mullion heater 18 in a circuit that parallels the baking element. This can be better understood by tracing the circuit as follows: for the baking element 16, the circuit is from line terminal L1, through switch contacts 82 to load terminal B, and then by lead 90 through baking element 16, by lead 91 through the closed thermostat contacts 92, and by lead 93 back to line L2. As for the broiling element 17 and mullion heater 18, the circuit is as follows: from line terminal L1 by internal switch lead 95 to switch contacts 84 to load terminal C, and then by lead 96 through mullion heater 18 and then in series with the broiling element 17 by lead 97 and then by lead 98 and leads 91 and 93 back to line L2 through the thermostat contacts 92.

The broiling circuit has the broiling element 17 as the only element that is energized and it is connected across the 240 volts of lines L1 and L2. The circuit is from line terminal L1 through internal switch lead 99 to switch contacts 80 and then to load terminal A. Then, by leads 100 and 101 to the broiling element 17 and then back to the line L2 through leads 98, 91 and 93 as well as through the thermostat contacts 92.

Next, there would be that heat cleaning circuit where all three heating elements 16, 17 and 18 are connected in parallel across the one-half line voltage of 120 volts from neutral conductor N to line L2. For example, the circuit for the mullion heater is from line terminal N through switch contacts 81 to load terminal A and leads 100 and 97 to mullion heater 18, and then by lead 96 to load terminal C to switch contacts 85 to line terminal L2 and then by lead 124 through the thermostat contacts 92 and lead 93 to line L2. In a similar manner, the circuit for the broiling element 17 is from load terminal A through leads 100 and 101 through broiling element 17 and back to line L2 through leads 91 and 93 and closed thermostat contacts 92. Lastly, the baking element circuit is from line terminal N through internal switch lead 103 through switch contacts 83 and then by lead 90 through baking element 16 and then back to line L2 through leads 91 and 93 and through thermostat contacts 92.

As mentioned previously, the power circuit is provided with a sequence timer 25 for obtaining the timing of either a timed baking operation or a heat cleaning operation. An example of a suitable timer is that disclosed in the Zagorski Patent 3,038,041 which is assigned to the General Electric Company, the assignee of the present invention. This type of timer would include an electric clock mechanism 105 and a start dial 106 and a stop dial 107 so that the timer could be set for automatic closing of the power circuit at a given starting time set on dial 106 and the circuit would be opened automatically at a given stop time set by the dial 107. This timer mechanism must be electrically energized and it is shown as being connected across line L1 and neutral conductor N by leads 108 and 109 respectively. The timer 25 has a single pole switch contact 110 that is interposed in the line L1 ahead of the line terminal T1. Accordingly, to bring the sequence timer 25 into the power circuit during time baking and heat cleaning, the switch contacts 87 must be closed in place of the switch contacts 86 which are closed only during the baking and the broiling operations.

Turning to a consideration of the temperature control device or thermostat 24, it is of the general type that is taught in the United States patent to Harry I. Baker, 2,962,575. Such devices have proved to be quite satisfactory for use as oven thermostats for normal cooking temperatures, but none of them have been commercially available at a reasonable price to extend over a wide temperature range that would cover, in addition to the normal cooking temperatures, the heat cleaning temperatures between about 750° F. and about 950° F. and still have the necessary degree of accuracy throughout the entire range of temperatures. An improvement has been made in this control system by the cooperation of a biasing resistor 72 that is shunted across the variable-resistance temperature senser 71 (located within the oven cavity) when the heat cleaning temperatures are desired. This biasing resistor 72 functions to shift the control point of the circuit so as to be able to attain accurate results for the complete range of temperatures. See the patent of Stanley B. Welch, No. 3,122,626, which was filed on November 24, 1961 and is likewise assigned to the General Electric Company. The thermostat 24 is a manually settable responder that includes a voltage regulating relay (not shown) so that the senser 71 varies the effective output voltage of the relay in accordance with the sensed temperature within the oven cavity regardless of variations in the line voltage. The thermostat includes a responder relay (not shown) that receives the effective output voltage of the voltage regulator and controls an output relay 112 that includes the thermostat contacts 92 which were mentioned previously as being the single-pole switching means for controlling the temperature within the oven cavity. In the event that cost is no objection a double-pole thermostat could be used.

Several precautionary measures are built into this temperature control circuit to insure that the oven door 15 is closed and the door latch means 37 is moved to its closed position before the heat cleaning operation commences. Connected in series with the biasing resistor 72 is both a senser switch 65 that is closed when the door latch mechanism is closed and a door switch 73 which is closed when the door is closed. This door switch 73 is not illustrated in the assembly views of FIGURES 1-3, but only in the circuit diagram of FIGURE 4, but it is to be understood that the switch is mounted on the front face of the oven adjacent the door opening and within the outlines of the door so that when the door is closed the door switch 73 is contacted by the door and closed. Suitable leads 114, 115, 116 and 117 connect the biasing resistor 72 in parallel with the temperature senser 71 and connect the door switch 73 and senser switch 65 in series with the biasing resistor 72.

Whenever the oven selector switch 23 is set at an energizing position, as distinguished from an Off position, a circuit is completed to the transformer 70 by means of load terminal D and leads 119 and 120 which is in turn connected back to the neutral conductor N. Connected in a parallel circuit across the secondary of the transformer 70 is an oven indicator light 121 as well as the smoke eliminator 34. This means that whenever the power circuit to the heating elements 16–18 is completed the transformer 70 and the low voltage temperature control circuit that includes the thermostat 24 will be energized as will the indicator light 121 and smoke eliminator 34. Moreover, a cycling pilot light 122 is connected in the power circuit to be energized whenever the thermostat contacts 92 are closed. This connection is made by a lead 123 to the load terminal D and by lead 124 to the thermostat contacts 92.

Now this brings us to the electrical control circuit for the locking means for the door latching mechanism. As mentioned previously, it is not possible to move the door latching mechanism by throwing the handle lever 38 until the pivoted bolt 53 is withdrawn from engagement with the connecting rod 50 by means of the operation of the solenoid 55. This solenoid is connected in a series circuit with a momentary pushbutton switch 126 across line L1 and neutral conductor N by means of leads 127, 128, 129, 130 and lead 120. It is also important to insure that the door latch mechanism cannot be opened once it is closed if the oven temperatures are in the heat cleaning range above the normal cooking temperature range of 550° F. This feature is provided by the bimetallic thermostat 75 located in series with solenoid 55 between leads 128 and 129. This thermostat is normally closed at all temperatures below the maximum cooking temperature of about 550° F. Once the oven temperature rises above this maximum the bimetallic thermostat 75 would be opened and the solenoid 55 would be rendered inoperative in spite of the closing of the momentary switch 126 until such time as the oven temperature returns to a degree below the set temperature of the thermostat.

It is also well to have a visual indication when the oven is operating in its heat cleaning cycle to inform the housewife that the door latch mechanism cannot and should not be opened. This information is supplied by a lock light 132 that is connected in parallel across the bimetallic thermostat 75. This lock light 132 is energized whenever the door latch mechanism has been closed which in turn causes the tab 59 on the connecting rod 50 of the latch mechanism 37 to shift forward and engage the button 68 of the single pole double throw switch 67 to complete a circuit between line L1 and neutral conductor N. This circuit may be traced from line L1 to lead 127 and lead 134 to the latch switch 67 and then by lead 135 through a current limiting resistor 136 which is connected in series with the parallel circuit of the lock light 132 and the bimetallic thermostat 75 as well as with the solenoid 55. The purpose of the resistor 136 is to allow the passage of very little current when the door is latched so that only the lock light 132 is energized and there is not enough current to operate the solenoid 55. In the specific embodiment illustrated, this resistor has a rating of about 5,000 ohms. The closing of the momentary pushbutton switch 126 serves to short out the resistor 136 thereby actuating the solenoid 55.

It should be noticed that the air circulating fan 30 is connected in this solenoid circuit across L1 and N so as to be energized whenever the door latch mechanism is closed. Mention is also made of the fact that when the latch switch 67 is in its unlatched position, as shown in FIGURE 4, the switch is connected in series with the line terminal L1 of the selector switch 23 by means of lead 138. In other words, the line terminal L1 of the selector switch 23 is only energized when the door latch mechanism is in its open or unlatched position. This is important to insure that the heat cleaning operation cannot be initiated when the controls are not set properly, even in the event the door latch mechanism is closed. If this were possible, the selector switch 23 might be set at either its baking or its broiling positions across full line voltage of 240 volts and permanent damage could be done to the porcelain enamel of the oven liner due to the rapid heat rise. Accordingly, if the door latch mechanism is closed when the oven switch is not set at the clean position, the latch switch 67 will disconnect the line L1 from the selector switch thereby de-energizing the power circuit and turning out the cycling pilot light 122 and the oven indicator light 121, while leaving only the lock light 132 energized.

Modifications of this invention will occur to those skilled in this art therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. An oven comprising an oven liner and an access door defining a cooking compartment, a three wire source of electrical power supply, at least three heating elements provided for said compartment including a lower baking element, an upper broiling element, and a mullion heater adjacent the door, terminals for connection with high and low voltage power sources, circuit control means connected with said terminals and said heating elements selectively operable to effect baking, broiling and high temperature heat cleaning operations for said oven, wherein for the baking operation said baking element is connected to said high voltage power source and said mullion element and broiling element are connected in series with each other and in parallel with said baking element across said high voltage power source, for said broiling operation said broiling element is connected to said high voltage power source, and for said heat cleaning operation all three of said heating elements are connected to said power source to effect a relatively gradual temperature rise in said oven to a relatively high heat cleaning temperature, whereby only two of the power supply wires are used during any particular cooking or heat cleaning operation, a sequence timing means connected with said circuit control means for timing said baking and heat cleaning operations, and temperature control switch means for controlling said heating elements when connected to establish said baking and broiling operations respectively to hold selected baking temperatures and a broiling temperature and also to control said three heating elements when connected to establish said heat cleaning operation to limit the temperature rise in said oven to a maximum ranging from 750° F. to 950° F.

2. An electric oven comprising an oven liner and an access door forming an oven cavity, at least three electrical resistance heating elements for said oven including a lower baking element, an upper broiling element and a mullion heater arranged adjacent the door, a three-wire system adapted to be connected to an Edison-type source of power supply, selector switch means for connecting said heating elements to said system to establish selectively baking, broiling and high temperature heat cleaning operations, wherein for the baking operation said baking element is connected to the three wire system so that the maximum voltage of said power source is applied to said baking element and said mullion and broiling elements are connected in series with each other and in parallel relation with said baking element across said maximum voltage, for the broiling operation said broiling element is connected to said three wire system so that the maximum voltage of said power source is applied to said broiling element, while for said heat cleaning operation all three of said heating elements are connected to said three wire system so as to be connected in parallel relation with each other and to the lower voltage of said power source, whereby only two of the power supply wires are used during any particular cooking or heat cleaning operation, and thermostatic control switch means connected with said system and said heating elements selectively operable to control said elements so as to hold selected baking temperatures in said oven when baking, to hold a broiling temperature in said oven when broiling and when heat cleaning to hold a maximum heat cleaning temperature between 750° F. and 950° F.

3. An electric oven comprising a box-like oven liner and an access door forming an oven cavity, at least three electrical resistance heating elements supplied with the oven including a lower baking element, an upper broiling element and a mullion heater arranged around the oven liner adjacent the door, three wires adapted to be connected to a three-wire alternating current voltage source and circuit means connecting the heating elements to said three wires, selector switch means controlling said circuit means for establishing the heating circuits for baking, broiling, and heat cleaning operations, a thermostatic control means for said heating circuits for holding selected temperatures during a baking operation, a broiling temperature during a broiling operation and a maximum temperature that ranges between 750° F. and 950° F. during the heat cleaning operation, door latch means for locking the oven door in the closed position while the oven is operating at the heat cleaning temperature, the said switch means connecting said three heating elements to said voltage source so that the rate of heat energy supplied to the oven cavity during the heat cleaning operation is substantially less than the rate of energy supplied during either the baking or the broiling operations, and safety means to prevent the operation of either the baking or the broiling circuits when the door latch is closed and the selector switch means is not set at a heat cleaning position, said safety means comprising switch means operated by the movement of the door latch for governing two control circuits alternately, one control circuit being completed to the selector switch means from one of the three wires of the voltage source for use during either the baking or the broiling operation when the door latch is opened, the other control circuit being completed to initiate the heat cleaning operation when the door latch is closed.

4. In an electric oven comprising an insulated cabinet supplied with an oven liner and an access door to form an oven cooking cavity, heating means for said oven cavity including a lower baking element, an upper broiling unit and a third heating element coextensive with at least part of the oven liner adjacent the door, a three wire source of electrical power supply, a circuit network adapted to connect the heating elements to the electrical power supply to furnish heat into the cooking cavity, a selector switch having an Off position and several On positions including a baking, a broiling and a heat cleaning position, said selector switch in its On position establishing one of at least three heating circuits, a manually settable thermostatic control device having a variable baking position, a single broiling position and a heat cleaning position, said thermostatic control device in its variable baking position correspondingly presetting a variable bake temperature for the cooking cavity in the normal cooking temperature range extending from about 150° F. to about 550° F., said thermostatic control device in its heat cleaning position presetting a maximum heat cleaning temperature located between about 750° F. and 950° F.; the invention comprising a sequence timing device in series with the selector switch and adapted to time either the baking or the heat cleaning operation, and said selector switch for the baking operation connecting said baking element to the full supply voltage of said power supply while said third heating element is connected in series with said broiling element in a circuit paralleling the baking element and to the full supply voltage of said power supply so that during the baking operation the broiling element operates at substantially one-quarter its rated wattage while the baking element operates at its rated wattage, whereby only two of the power supply wires are used during any particular cooking or heat cleaning operation.

5. In an electric oven as recited in claim 4 wherein the said thermostatic control device is a single pole thermostat that controls the temperatures of all of the heating circuits.

6. A power circuit for an electric oven comprising three wires adapted to be connected to a three-wire Edison-type source of alternating current voltage supply, a group of at least three heating elements including a baking element, a broiling element and a mullion heater, and leads connecting the heating elements in a network to said three wires, a circuit selector switch interposed in the leads of the network for arranging various circuit combinations, and a low voltage control circuit comprising an electrical thermostatic device having a single pole contact means in the leads of the power circuit and a temperature senser adapted to cooperate with the oven and sense its temperature and feed back this information through the thermostatic device which in turn cycles the contact means depending upon the demand for more heat in the oven, there being at least two cooking circuits and a high temperature heat cleaning circuit, one cooking circuit being a backing circuit with the baking element connected across the full voltage of the power supply and the mullion heater connected in series with the broiling element in a circuit paralleling the baking element, so that during the baking operation the broiling element will be operated at substantially one-quarter its rated wattage while the baking element is operating at its rated wattage, whereby only two of the power supply wires are used during any particular cooking or heat cleaning operation.

7. An electric oven comprising an insulated cabinet enclosing a box-like oven liner and a front-opening access door to close the oven liner and define a cooking compartment, at least three electric resistance heating elements provided for said compartment, including a lower baking element, an upper broiling element and a mullion heater adjacent the door, three wires adapted to be connected to a three-wire Edison-type source of alternating current voltage supply, and a circuit network connecting the heating elements to the voltage supply, selector switch means interposed in the circuit network between the voltage supply and the load represented by the three heating elements to obtain various circuit combinations, manually settable thermostatic control means having a senser located adjacent the oven compartment to detect the temperature therein and connected to a responder that serves as a pulsing thermal relay, and an output relay controlled by the responder and located in the power circuit to the heating elements for delivering energy to the elements as a succession of pulsations, the selector switch and the thermostatic control means being settable to effect the selective energization of said heating elements from said voltage supply to obtain a baking operation, a broiling operation and a heat cleaning operation, and door latch means for locking the oven door in the closed position during the heat cleaning operation; the invention comprising a protective means to insure that the selector switch is set in a heat cleaning position before the door latch is closed and the heat cleaning circuit is completed, said protective means comprising a door latch operated double pole switch means that alternatively controls one of two possible circuits, a first circuit being the power circuit for the baking and broiling operations when the door latch is opened, and the second circuit being a thermally controlled circuit for locking the door latch means in the closed position while the temperature of the oven compartment is above normal cooking temperatures of about 550° F. and in the heat cleaning temperature range that extends as high as 950° F.

8. An electric oven as recited in claim 7 with the addition of an indicator light in the second circuit of the protective means which light is energized when the door latch means is closed to indicate to the user the closed condition of the door latch and to insure that the light is not energized during normal cooking operations.

9. In an electric oven comprising an insulated cabinet supplied with an oven liner and an access door to form an oven cooking cavity, heating means for said oven cavity including a lower baking element, an upper broiling unit and a third heating element coextensive with at least part of the oven liner adjacent the door, a circuit network adapted to connect the heating elements to an electrical power supply to furnish heat into the cooking cavity, a selector switch having an Off position and several On positions including a baking, a broiling and a heat cleaning position, said selector switch in its On position establishing one of at least three heating circuits, a manually settable thermostatic control device having a variable baking position, a single broiling position and a heat cleaning position, said thermostatic control device in its variable baking position correspondingly presetting a variable bake temperature for the cooking cavity in the nrmal cooking temperature range extending from about 150° F. to about 550° F., said thermostatic control device in its heat cleaning position presetting a maximum heat cleaning temperature located between about 750° F. and 950 F.; the invention comprising a sequence timing device in series with the selector switch and adapted to time either the baking or the heat cleaning operation, and said selector switch for the baking operation connecting said baking element to the full supply voltage of the power supply while said third heating unit is connected in series with said broiling element in a circuit paralleling the baking element and to the full supply voltage of said power supply so that during the baking operation the broiling element also operates at substantially one-quarter its rated wattage while the baking element operates at its rated wattage, said thermostatic control device being a single pole thermostat that controls the temperatures of all the heating circuits, and a door latch means for locking the oven door in the closed position while the oven is operating in the heat cleaning temperature range, and protective means cooperating with the door latch means to de-energize the heating means if the door latch is closed and the selector switch is set at either its baking or broiling positions, said protective means also serving as an interlock means to set up a heat cleaning circuit upon the closing of the door latch means in the event the selector switch and the thermostatic control device are both set to the heat cleaning positions.

10. A power circuit for an electric oven comprising three wires adapted to be connected to a three-wire Edison-type source of alternating current voltage supply, a group of at least three heating elements including a baking element, a broiling element and a mullion heater, and leads connecting the heating elements in a network to said three wires, a circuit selector switch interposed in the leads of the network for arranging various circuit combinations, and a low voltage control circuit comprising an electrical thermostatic device having a single pole contact means in the leads of the power circuit and a temperature senser adapted to cooperate with the oven and sense its temperature and feed back this information through the thermostatic device which in turn cycles the contact means depending upon the demand for more heat in the oven, there being at least two cooking circuits and a high temperature heat cleaning circuit, one cooking circuit being a baking circuit with the baking element connected across the full voltage of the power supply and the mullion heater connected in series with the broiling element in a circuit paralleling the baking element, so that during the baking operation the broiling element will be operated at substantially one-quarter its rated wattage while the baking element is operating at its rated wattage, a protective means to insure that the selector switch is set in a high temperature heat cleaning position before the heat cleaning circuit can be completed, said protective means comprising a switch means that alternately controls one of two circuits, a first circuit providing power for the baking and broiling circuits and a second circuit for preparing the thermostatic device for the heat cleaning operation.

References Cited by the Examiner

UNITED STATES PATENTS

| 2,303,460 | 12/1942 | Hodgkins | 219—486 |
| 2,415,768 | 2/1947 | Shaw | 219—402 |
| 3,092,706 | 6/1963 | Chisholm | 219—398 |
| 3,094,605 | 6/1963 | Welch | 219—398 |
| 3,121,158 | 2/1964 | Hurko | 219—398 X |

ANTHONY BARTIS, *Acting Primary Examiner.*

RICHARD M. WOOD, *Examiner.*

R. F. STAUBLY, *Assistant Examiner.*